United States Patent [19]

Davis et al.

[11] Patent Number: 5,668,957

[45] Date of Patent: Sep. 16, 1997

[54] METHOD AND APPARATUS FOR PROVIDING VIRTUAL DMA CAPABILITY ON AN ADAPTER CONNECTED TO A COMPUTER SYSTEM BUS WITH NO DMA SUPPORT

[75] Inventors: Gordon Taylor Davis, Raleigh, N.C.; Robert James Devins, Essex Junction, Vt.; Patrick Kwong-hung Kam, Pickering, Canada; James L. Patrick, Jr., Cary, N.C.; John Michael Krause, Schaumburg, Ill.

[73] Assignee: International Business Machines Corporation, Armonk, N.Y.

[21] Appl. No.: 556,773

[22] Filed: Nov. 2, 1995

[51] Int. Cl.$^6$ .............. G06F 13/10; G06F 13/12
[52] U.S. Cl. .......... 395/309; 395/500; 395/842; 395/843; 395/527; 395/830
[58] Field of Search ................ 395/500, 309, 395/842, 843, 527, 830; 364/200

[56] References Cited

U.S. PATENT DOCUMENTS

| | | | |
|---|---|---|---|
| 4,464,733 | 8/1984 | Misher et al. | 364/900 |
| 4,523,297 | 6/1985 | Ugon et al. | 364/900 |
| 4,847,750 | 7/1989 | Daniel | 364/200 |
| 5,083,259 | 1/1992 | Maresh et al. | 395/325 |
| 5,237,609 | 8/1993 | Kimura | 380/3 |
| 5,335,329 | 8/1994 | Cox et al. | 395/325 |
| 5,537,607 | 7/1996 | Ploger, III. | |

*Primary Examiner*—Jack B. Harvey
*Assistant Examiner*—Rupal D. Dharia
*Attorney, Agent, or Firm*—Steven B. Phillips

[57] ABSTRACT

Apparatus and method for providing virtual DMA capability for an adapter card connected to a host system bus with no DMA support. A special interface circuit resides on an adapter card together with a cache data memory. A special software driver resides in the host system. The software driver manages DMA transfers for the application processing circuitry on the adapter card using the cache data memory. The processing circuitry on the adapter card transfers data in and out of the cache data memory as if it had direct memory access to host system memory. In this way, an adapter card for a non-DMA-capable bus, such as the personal computer memory card international association (PCMCIA) bus can act as a bus master.

16 Claims, 6 Drawing Sheets

METHOD AND APPARATUS FOR PROVIDING VIRTUAL DMA CAPABILITY ON AN ADAPTER CONNECTED TO A COMPUTER SYSTEM BUS WITH NO DMA SUPPORT

BACKGROUND

1. Field of the Invention

This invention relates to the bus master function provided by peripheral adapter cards for personal computers. More particularly, it is related to providing the direct memory access (DMA) capabilities necessary to allow bus master function in situations where the host system bus of a personal computer does not support DMA data transfers.

2. Definition of the Problem

With increased use of personal computers in every facet of business and personal life has come the demand for ever-increasing capabilities of peripheral adapter cards that plug those personal computers. One important way that adapter cards are given increased performance and function is to provide cards with bus master capability. An adapter card with bus master capability plugs into the main system bus of a personal computer and can control data transfers directly into and out of the computer system memory for use by processing circuitry on the adapter card. In most cases this processing circuitry is a special purpose microprocessor such as a micro controller or a digital signal processor.

In order for an adapter card to control its exchange data with the system memory, the system bus of the personal computer involved must have direct memory access capability, commonly called "DMA" capability. Operating principles for computer buses with DMA capability are well known in the art, and many types of computer system buses today have DMA capability. For example, FIG. 1 shows a block diagram of an adapter card plugged into to an industry standard architecture (ISA) bus found in many IBM compatible personal computers. A system master controller 103 exchanges "request" and "ack" commands with the host system DMA controller 101 so that data can be exchanged directly between host system memory 102 and card SRAM memory 105 for use by a processor on the adapter card.

While the ISA bus provides sufficient DMA capability for most purposes, a method has been described to provide improved DMA capabilities for the ISA bus in U.S. Pat. No. 4,847,750 to Daniel, which is incorporated herein by reference. Additionally, a way of providing DMA capability to a remote expansion chassis on a type of system bus called an Sbus is described in U.S. Pat. No. 5,335,329 to Cox et al. which is incorporated herein by reference. These and other methods of improving DMA capability in the prior art all depend on the use of a system bus that has some DMA capability.

An adapter card designer is faced with a much greater problem when dealing with a host system bus not designed to support bus master adapter cards because such a host system bus has no DMA capability at all. An example of such a bus is the Personal Computer Memory Card International Association bus, commonly called the PCMCIA bus. The PCMCIA bus is popular for use in laptop and notebook personal computers because it requires very little space. However, the bus provides no DMA capability at all, and therefore bus master cards are not supported. This lack of capability makes designing adapter cards difficult. Not only must a card be designed to work with no DMA, but also a different electrical design and different software driver must be developed for PCMCIA and ISA versions of the same adapter card. What is needed is a way to simulate DMA at an adapter card interface. If this could be done, "virtual DMA" capability could be provided so that the adapter card processor works the same way on a PCMCIA adapter card as on an ISA adapter card, simplifying the design and allowing the same software driver to be used for both types of cards. Such a scheme would not only be very useful for PCMCIA adapter cards, but would also be useful in adapter cards designed for other buses which do not provide DMA capability.

SUMMARY

The above needs are met by the present invention which provides an interface circuit for use on an adapter card and a software driver which resides in the host system. These components together with a cache memory system which resides on the adapter card provide virtual DMA capability and hence bus master capability for an adapter card in a host system built around a bus with no DMA capability.

The present invention includes an interface circuit with address and data connections for a DMA-capable bus, a non-DMA-capable bus and a cache memory. The interface circuit also has command and control connections for a cache memory. An array of multiplexers is disposed between the DMA and non-DMA-capable bus connections and a cache memory so that the cache memory can be alternatively connected to either a DMA-capable or the non-DMA-capable bus. Bus cycle state control logic and refresh/arbitration logic are included in the interface circuit and are connected to the multiplexer array. The interface circuit also includes memory command and control logic connected between the cache memory connections, the refresh/arbitration logic and the bus cycle state control logic.

The preferred embodiment of the interface circuit disclosed is used to provide virtual DMA capability for adapter cards designed for the personal computer memory card international association (PCMCIA) bus. These adapter cards usually provide the same function as cards used with the industry standard architecture (ISA) bus used in many desktop personal computers. Both the PCMCIA and ISA busses have sixteen bits. For cost or space reasons, it may be desirable to use an eight bit memory for the cache data memory. In this environment and with any other system in which an eight bit memory is used and the busses are a sixteen bit busses, the multiplexer array of the interface circuit described above selects high and low bytes in sequence to provide sixteen bit access to an eight bit cache memory. The cache memory is connected to the interface circuit via the cache memory address and data connections.

The interface circuit described above is used on an adapter card which plugs into the non-DMA-capable bus of a host system. The circuit resides on the adapter card together with a non-DMA capable bus interface, processing circuitry to provide function for the normal adapter card application, and the cache data memory. A flash buffer memory is also included on the adapter card. The flash memory is used on PCMCIA adapter cards to store identification and configuration information. The processing circuitry is normally of the same design as that used on adapter cards for the same application which are designed for a DMA-capable bus. The processing circuitry is connected to the DMA-capable bus interface of the interface circuit in the same manner as it would be connected to a DMA-capable bus.

In order to use the adapter card described above, a software driver must be running in the host system memory.

With the software driver installed, the same application software can be run on a host system having a bus without bus master capability but using an adapter card as described above as is run in a host system with full DMA and hence bus master capability. The software driver first opens a common memory window between host system memory and data cache memory on the adapter card. This window is opened upon initialization of the software driver. When an application program needs to do a DMA transfer, the software driver receives the request. The driver then determines the direction of data flow. If data is to be moved from the adapter card to system memory, the driver transfers a DMA packet from the adapter card processing circuitry to the data cache memory and issues a host system interrupt. The driver then issues a move instruction and transfers the DMA packet to the host system memory from the cache memory. If the data is to be transferred from host system memory to the adapter card processing circuitry, the driver issues a move instruction for the host system processor. A DMA packet is then moved from host system memory to the data cache memory on the adapter card and subsequently loaded into the adapter card processing circuitry. The software driver is typically supplied to users embodied in a computer storage device as a computer program product.

This invention provides a way for a host computer system having an adapter card bus without DMA capability and without bus master capability to run application software that normally requires bus master capability and/or DMA. This invention also provides a way to use the same adapter card processing circuitry on different versions of an adapter card, namely versions designed for a bus having bus master capability and versions designed for a bus without bus master capability. These capabilities greatly reduce design complexity and expense for both adapter card designers and application software programmers.

DETAILED DESCRIPTION OF THE PREFERRED EMBODIMENT

Figure 1:
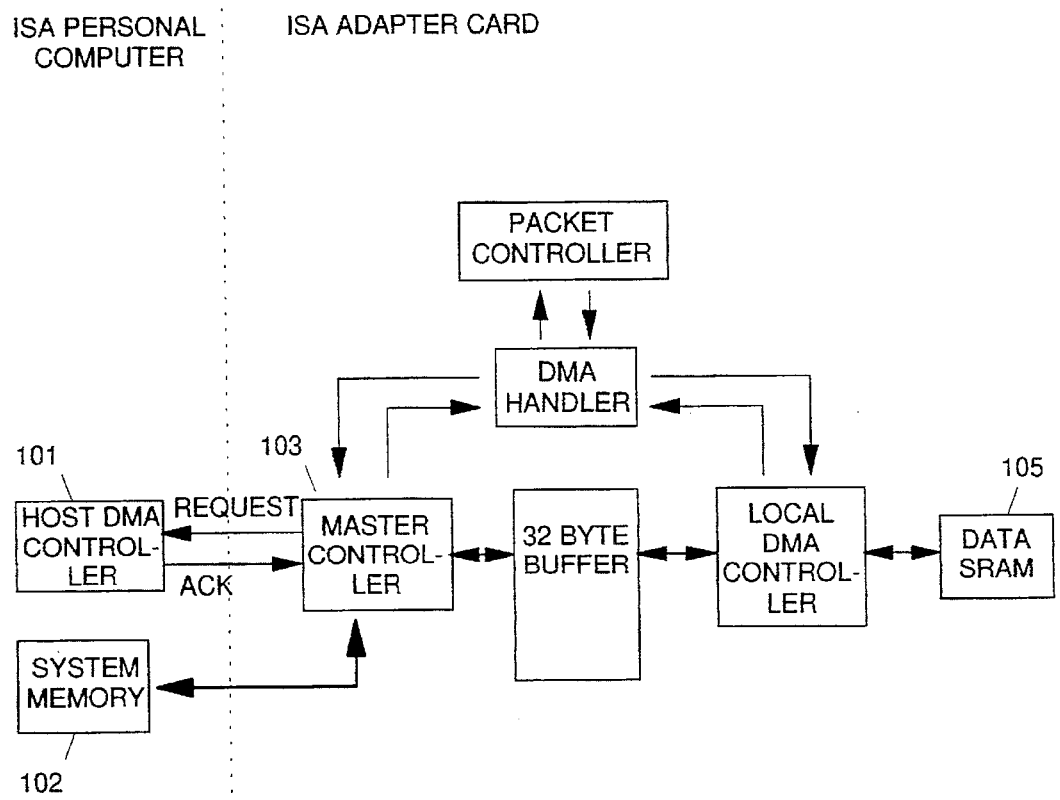
FIG. 1 shows how an adapter card is normally interfaced to a host system having DMA and bus master capability.
Figure 2:
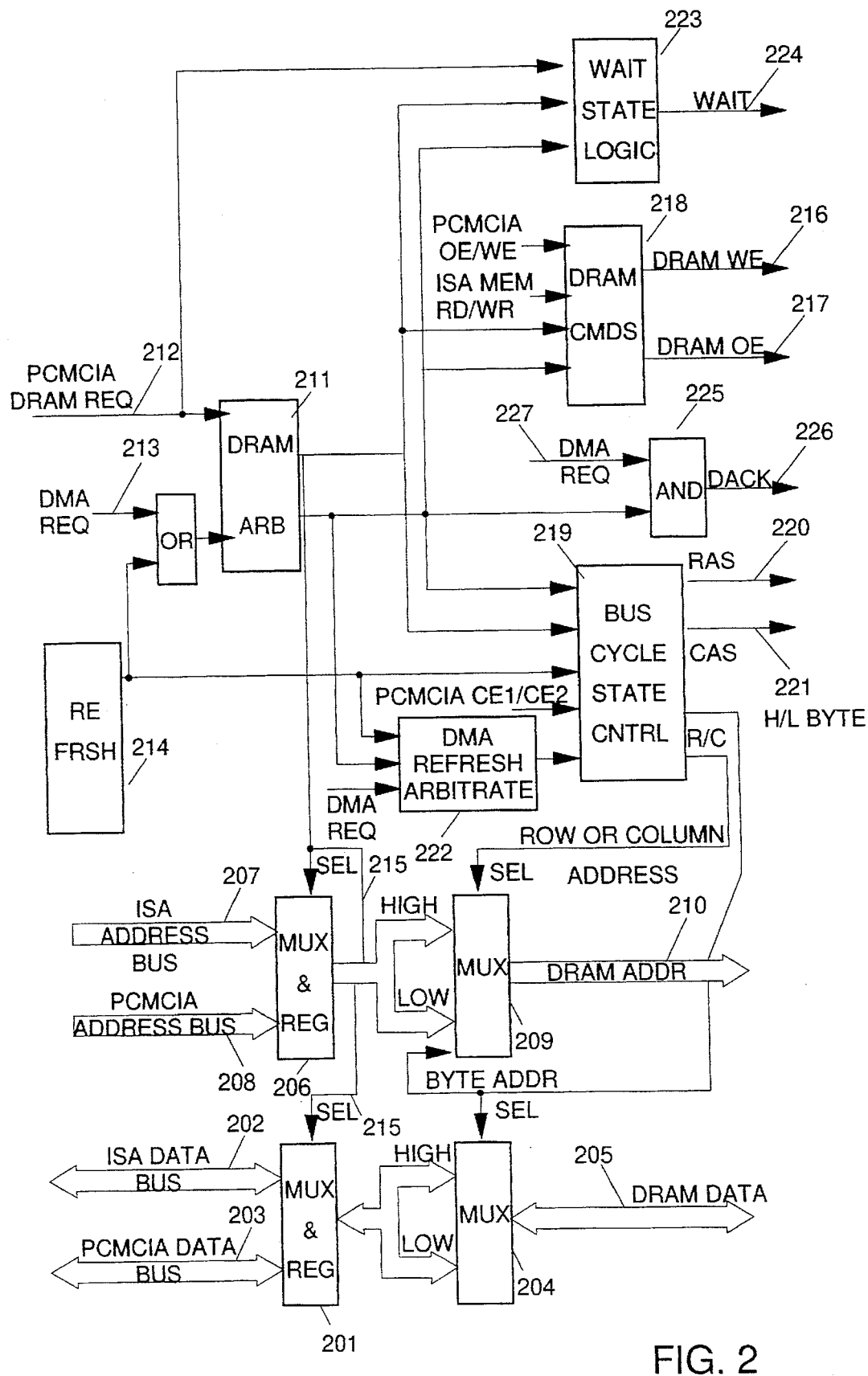
FIG. 2 is a block diagram of the interface circuit of the present invention.

FIG. 2 shows a block diagram of the interface circuit used in the preferred embodiment of the invention. For purposes of this discussion, we are assuming the non-DMA capable bus is a PCMCIA bus, and the DMA capable bus is an ISA bus. With little or no changes, however, the interface circuit works in other operating environments with other buses. The DMA-capable bus address and data connections are shown at 207 and 202 respectively. The non-DMA-capable address and data connections are shown at 208 and 203 respectively. These bus connections include connections for control lines which will be readily understood to be present by those of ordinary skill in the art, but which are not shown for simplicity. The cache data memory address and data connections are shown at 210 and 205 respectively. The cache memory in the preferred embodiment is implemented with eight bit DRAM. The cache memory command and control connections include WE, 216, OE, 217, RAS, 220, and CAS, 221. The WE connection is for the write enable function. This line strobes data into the DRAM. The OE connection provides the output enable function which strobes data out of the DRAM. RAS and CAS stand for row address select and column address select, respectively. These functions are well known. The row address select line strobes the most significant bits of the DRAM address into the DRAM. The column address select line strobes the least significant bits of the DRAM address into the DRAM. The full address of the DRAM data is made up of the RAS and the CAS bits.

The multiplexer array includes the address multiplexers 206 and 209 and the data multiplexers 201 and 204. The multiplexer 204 selects high and low bits in sequence to provide sixteen bit access to an eight bit cache data memory. Bus cycle state control logic 219 is connected between the RAS and CAS connections 220 and 221 and the multiplexer array. Refresh and arbitration logic includes DRAM arbitration logic 211, DRAM refresh timer 214, and DMA refresh and arbitration logic 222. Memory command and wait logic includes DRAM command generation logic 218, wait state logic 223 and AND gate 225.

In the operation of the circuit, data bus multiplexer 201 connects either the ISA data bus 202 or the PCMCIA data bus 203 to the cache data memory via byte multiplexer 204 and DRAM data bus 205. Byte multiplexer 204 selects the high byte or low byte in sequence to translate a single sixteen bit access from the ISA or PCMCIA bus into two eight bit memory cycles accessing the cache memory. Address multiplexer 206 connects either the ISA address bus 207 or the PCMCIA address bus 208 to the data cache via RAS/CAS multiplexer 209 and DRAM address bus 210. RAS/CAS multiplexer 209 selects either the row address or column address from the high or low half of the input address according to industry standard address timings for dynamic RAM modules.

DRAM arbitration logic 211 receives bus cycle requests from the PCMCIA DRAM request line 212, ISA bus DMA request line 213, or DRAM refresh timer 214, and generates a select signal on line 215 which controls which address bus is selected via address bus multiplexer 206. The select signal also controls which data bus is selected via data bus multiplexer 201. DRAM arbitration logic 211 also enables DRAM command lines WE 216 and OE 217. The signals WE and OE are generated by DRAM command generator 218. Bus cycle state control logic 219 generates the basic timing sequences required for DRAM memory access cycles, and generates RAS and CAS address strobes over RAS and CAS lines 220 and 221, respectively. Bus cycle state control logic 219 also controls RAS/CAS multiplexer 9 for selecting the required part of the address. Bus cycle state control logic 219 also controls byte multiplexer 204 for selecting the required data byte for each DRAM memory cycle.

DMA refresh/arbitration control logic 222 interfaces between the arbitration logic 211 and the bus cycle state control logic 219 to ensure that the state controller 219 generates the desired bus cycle sequence or priority for the various events that can occur during a bus cycle. In the preferred embodiment the bus cycle priority of the possible events is as follows:

1—DMA Request
2—PCMCIA DMA Request
3—Refresh

If all of these events occur simultaneously, the arbitration winner will be the priority 1 event until it completes, followed by the priority 2 event until it completes, followed by the priority 3 event. DRAM arbitration logic 211 is connected to wait state logic 23 to generate a wait signal at 224 for the PCMCIA bus in order to pace transfers at the PCMCIA interface. Logic 211 is also connected to gate 225 in order to generate a DMA acknowledgment signal (DACK) on DACK line 226 to be sent to the on-card ISA bus to pace transfers into or out of the adapter card processor when the adapter card processor initiates a DMA transfer. If a PCMCIA bus cycle is active and the on-card processor requests DMA on line 227, the DMA acknowledgment is blocked by the arbitration circuit until the end of the PCMCIA bus cycle. Once the DMA transfer is started, the transfer will continue until the burst is complete, during which time, if a PCMCIA bus cycle is active, the arbitration circuit will hold off the PCMCIA bus cycle by activating "wait" line 224. The DMA burst size in the preferred embodiment is programmable from two to sixteen transfers per burst, and the time delay between DMA requests is also programmable. These parameters can be adjusted to fine tune the relative access priorities of the two busses.

Figure 3:
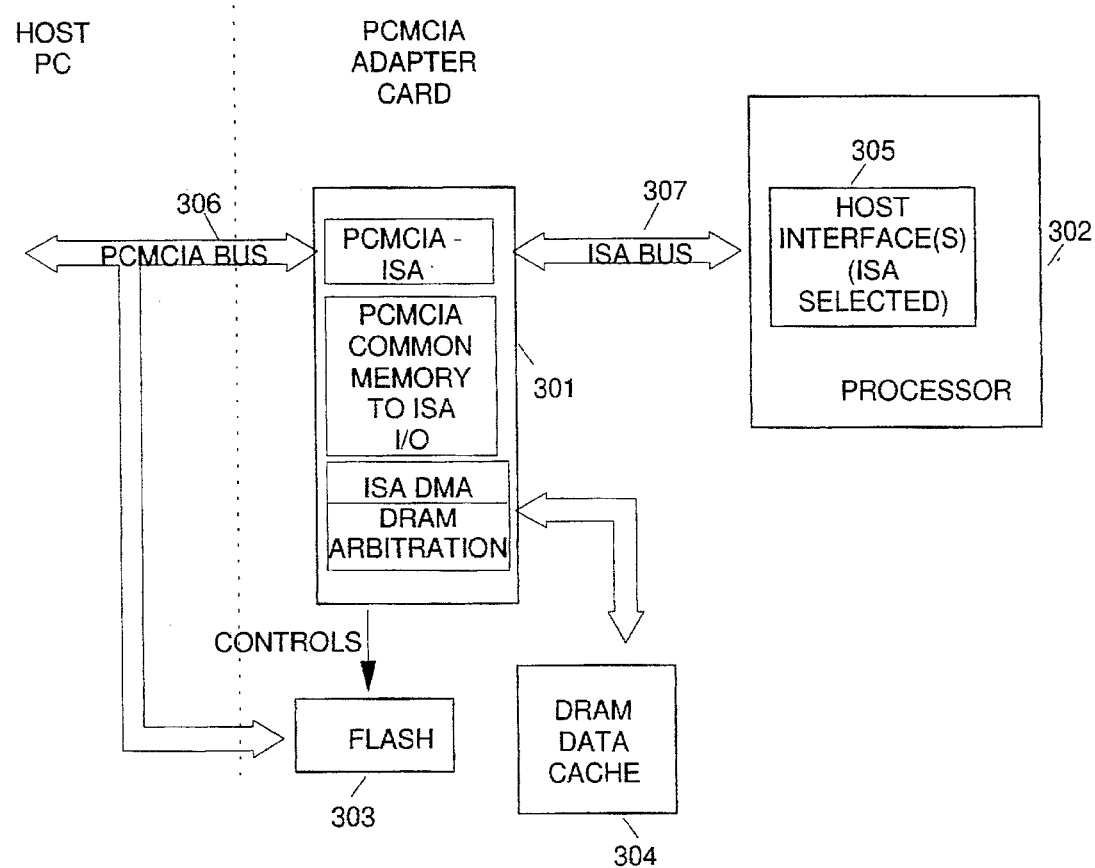
FIG. 3 is a block diagram of the adapter card of the present invention, the adapter card being plugged into a host system bus.

FIG. 3 shows an adapter card on which the circuit described above is employed. In the preferred embodiment, the adapter card is a PCMCIA adapter card and the on-card DMA-capable bus is an ISA bus. The circuit 301 of FIG. 2 is disposed between the on-card ISA bus 307 and the PCMCIA bus 306. Adapter card processing circuitry 302 is connected to the ISA bus 307 through an ISA host interface 305. The card processing circuitry 302 in the preferred embodiment comprises a special purpose microprocessor, such as a digital signal processor, which is used to perform the application functions of the adapter card. The DRAM 304 which serves as the cache data memory 304 is connected to the interface circuit 301. A flash memory 303 is connected between the PCMCIA bus and the interface circuit 301. In the preferred embodiment, the flash memory contains a data structure in a standard format according to the PCMCIA specification. This data structure is used to communicate to the host software driver the identification of the adapter card, the function of the adapter card, the power requirements of the adapter card, the window requirements of the adapter card, and other similar information. This information is used by the software driver to properly configure the card. The flash buffer memory is not necessary to the operation of the present invention, but is shown to more completely illustrate the typical operating environment of the invention.

In operation, DMA requests generated by the card processor 302 are received by the interface circuit 301 over bus 307 instead of directly by the host processor as would be the case in a DMA capable host system. DMA data is first transferred across bus 306 one word at a time and stored in cache 304. When the DMA request is received by the interface circuit 301 from the card processor 302 data is transferred one word at a time to the card processor back through bus 307 and host interface 305.

Figure 4:
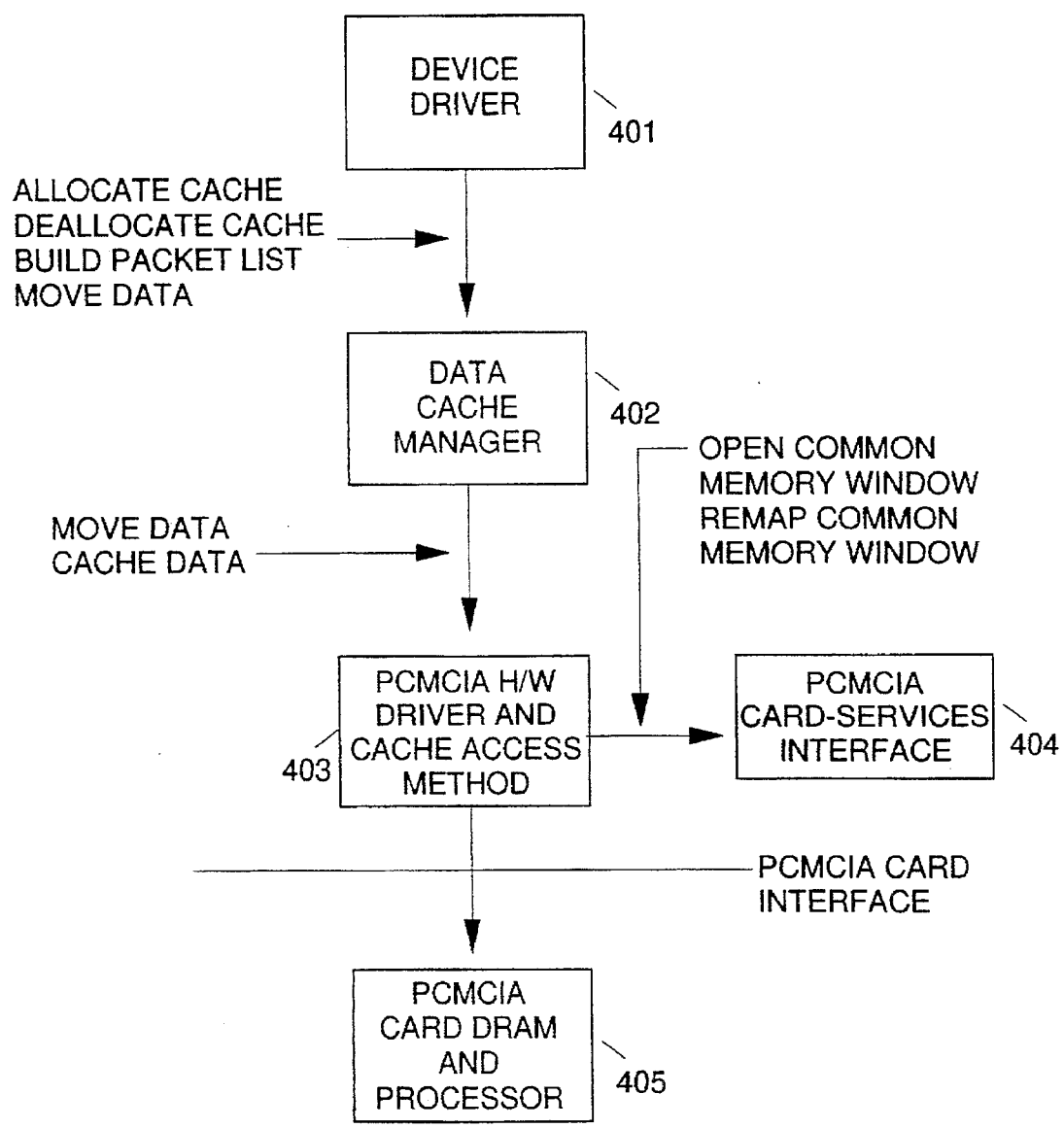
FIG. 4 is a block diagram showing the components of the software driver of the present invention.

In order for the adapter card described above to function with a host computer system, a software driver must be loaded into the host computer system. Application software uses the software driver to access the adapter to perform the desired functions. FIG. 4 shows a block diagram of the software components of the software driver. The device driver 401 provides the application software with interface information for the adapter card processing circuitry so that the application software can perform operations with the adapter card processing circuitry. The data cache manager 402 provides cache data memory management functions, provides an application programming interface (API) for the cache data memory, and interfaces with the hardware driver for the non-DMA capable bus. In the preferred embodiment, the non-DMA-capable bus is the PCMCIA bus, and the PCMCIA hardware driver is shown at 403. The PCMCIA hardware driver 403 provides the access method for the data cache and interfaces with the PCMCIA card services interface which controls access to common memory windows. The hardware driver 403 may also re-map the common memory window as needed. All of these components function together to provide access to the DRAM which serves as the data cache memory and the adapter card processing circuitry, both of which are on the adapter card and are shown at 405.

Figure 5:
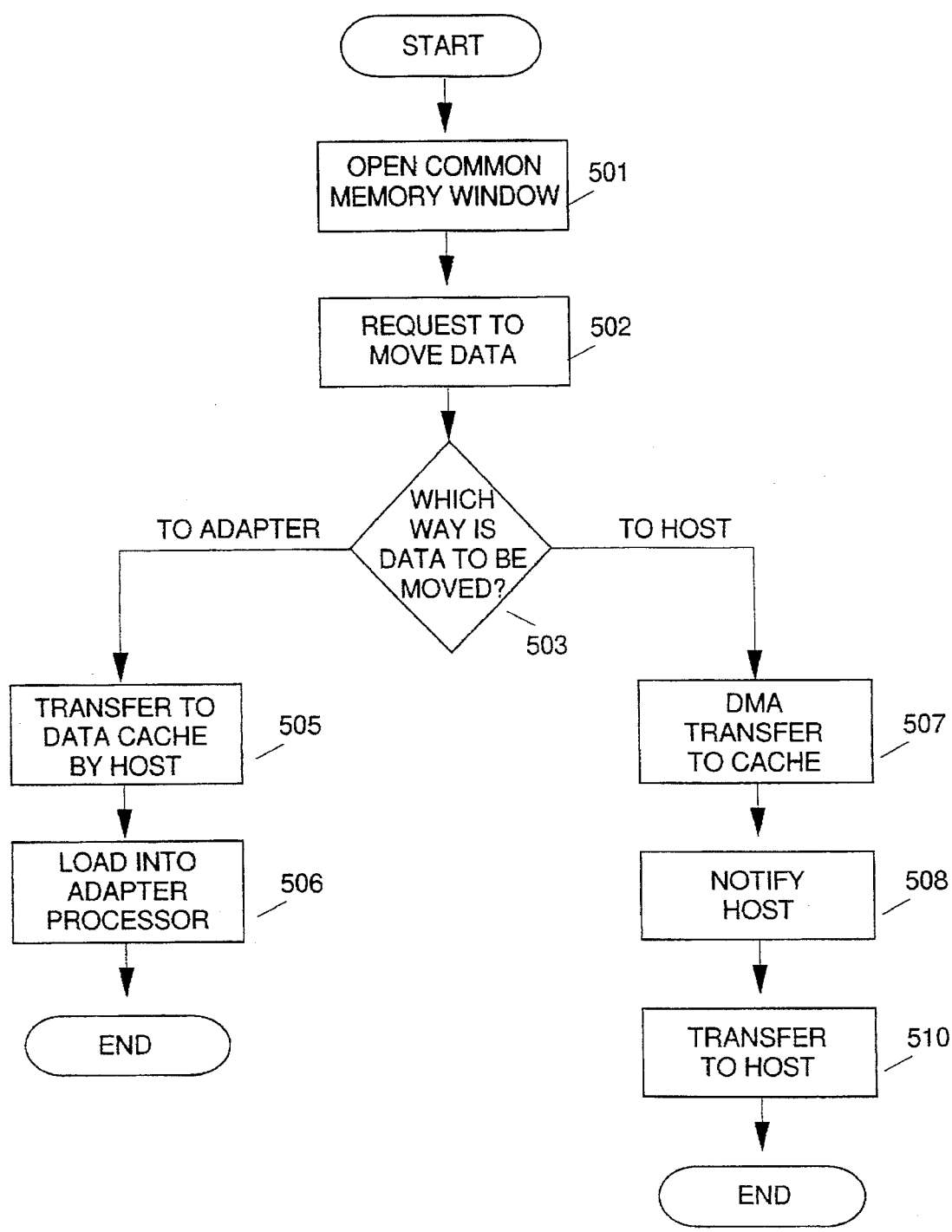
FIG. 5 is a flowchart showing the method executed by the software driver of the present invention.

FIG. 5 shows the method executed by the software driver described above to make DMA data transfers between the host computer system and the card processor. Upon initialization, the software driver opens a common memory window between the data cache memory on the adapter card and the host system memory at 501. In the preferred embodiment a 4 KB window is opened. The software driver then receives a request to move data or make a DMA transfer from the application software at 502. At 503 a determination is made as to which direction the data is to be moved. In the case where DMA data is to be moved from the host system to the adapter a move instruction is issued to the host system processor at 504, a transfer of a DMA packet is then made to the data cache memory at 505, and the data is subsequently loaded into the adapter card processor at 506 via local, on-card ISA DMA, where the adapter card processor serves as the DMA master.

In the case where it is determined at 503 that the transfer is to be made from the adapter card to the host, the adapter card processor moves a DMA packet to the cache data memory at 507 and notifies the host computer system at 508 that the transfer has taken place. In the preferred embodiment, this notification is made by issuing a host system interrupt; however, other methods could be used, for example, the setting of a bit in a register. After the notification is received, the host processor moves data to the host system memory. In the preferred embodiment this is accomplished by the issuance of a move instruction to the host processor and the data is moved from the cache memory to the host system memory at 510. Other ways of moving the data can be used. One alternative is to have the host processor program a DMA controller to move the data.

For the movement of data described above, the cache manager 402 of FIG. 4 uses the access method provided by the hardware driver 403 of FIG. 4. In the preferred embodiment, on a PCMCIA adapter card, blocks of data no more than 4 KB in size are moved. 512 KB of DRAM are used as the data cache memory. Each 4 KB transfer is mapped to a specific physical data cache address by the PCMCIA card services interface 404 of FIG. 4.

Figure 6:
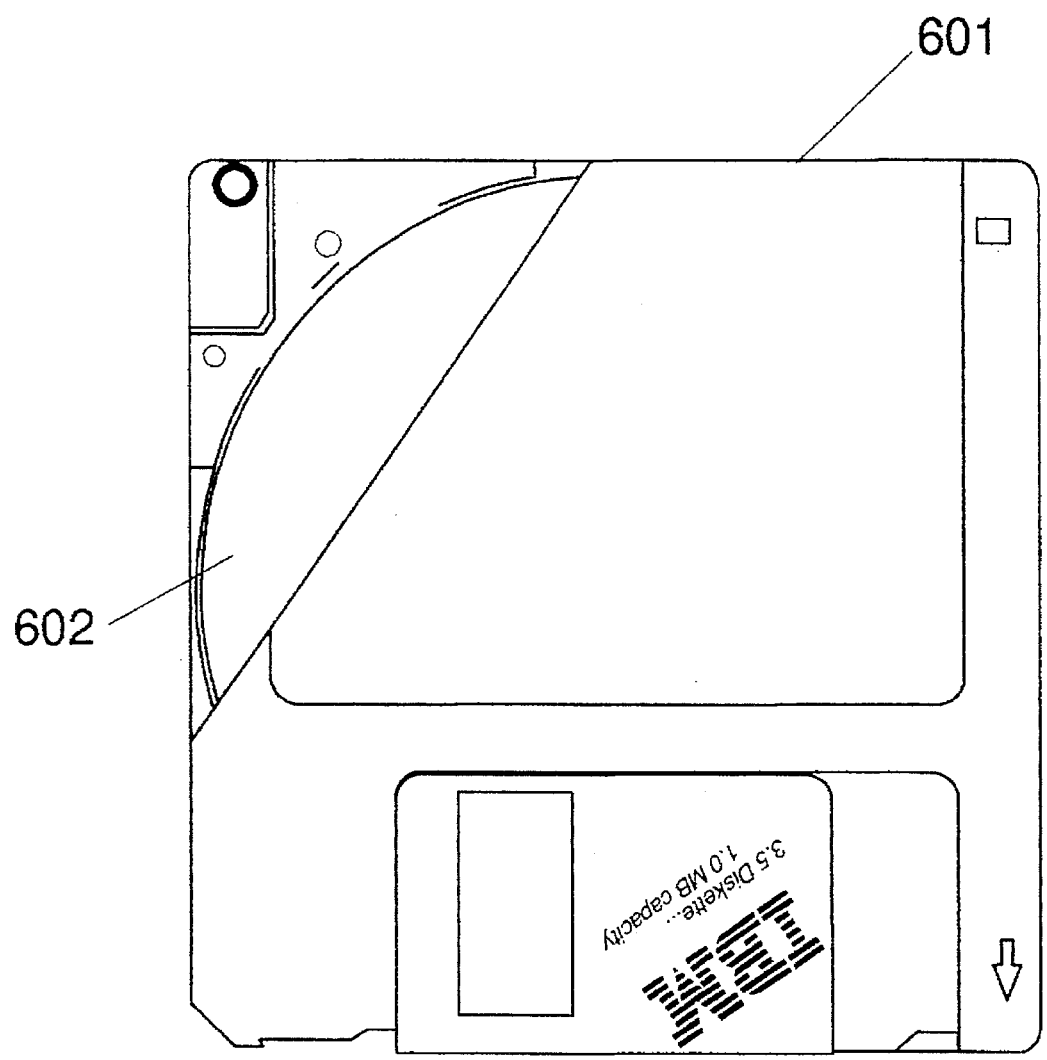
FIG. 6 shows a computer storage device on which the software driver of the present invention is typically supplied.

FIG. 6 show a diagram of a computer storage device, namely a diskette, on which the instructions to effect the computer implemented method described above are typically embodied as a computer program product. The diskette comprises a jacket 601 which encloses a magnetic medium 602. Computer program instructions in machine readable form are recorded on the medium 602 and read by a computer. These instructions cause the machine to effect the various steps of the method of FIG. 5. Although we have shown the storage device embodiment of a diskette, a computer usable medium of any kind, for example a tape or a CD-ROM, can be used. A program containing these instructions can also be distributed electronically.

We have described a way to provide virtual DMA capability and therefore bus master capability for an adapter card attached to a host computer system bus with no DMA capability built in. We have described a preferred embodiment of our invention for use in the personal computer memory card international association bus. One of ordinary skill in the art, however, will quickly appreciate that this solution can be applied to any non-DMA-capable bus architecture to enable adapter cards to act as bus master cards.

We claim:

1. An interface circuit for providing virtual direct memory access (DMA) capability to an adapter card connected to a computer system bus without DMA support, the interface circuit comprising:

DMA-capable bus connections;
non-DMA-capable bus connections;
cache memory address and data connections;
cache memory command and control connections;
a multiplexer array disposed between the DMA and non-DMA capable bus connections and the cache memory address and data connections so that a cache memory can be alternatively interfaced to a DMA and a non-DMA capable bus;
bus cycle state control logic disposed between the cache memory command and control connections and the multiplexer array;
refresh and arbitration logic connected to the bus cycle state control logic and the multiplexer array, the refresh and arbitration logic and the bus cycle state control logic for controlling the multiplexer array; and
memory command and wait logic disposed between the memory command and control connections and the refresh and arbitration and bus cycle state control logic.

2. The interface circuit of claim 1 wherein the multiplexer array selects high and low bytes in sequence to provide sixteen bit access to an eight bit cache memory.

3. The interface circuit of claim 1 wherein the DMA-capable bus is an industry standard architecture (ISA) bus and the non-DMA-capable bus is a personal computer memory card international association (PCMCIA) bus.

4. The interface circuit of claim 2 wherein the DMA-capable bus is an industry standard architecture (ISA) bus and the non-DMA-capable bus is a personal computer memory card international association (PCMCIA) bus.

5. The interface circuit according to any of claims 1 through 4 further comprising a cache memory connected to the cache memory data and address connections and the cache memory command and control connections.

6. An adapter card which provides virtual direct memory access (DMA) capability while connected to a computer system bus without DMA support, the adapter card comprising:

a non-DMA-capable bus interface;
adapter card processing circuitry having an on-card, DMA, capable bus interface;
a cache data memory;
an interface circuit for providing virtual DMA capability to the adapter card processing circuitry, the interface circuit connected to the cache data memory and disposed between the non-DMA capable bus interface and the on-card, DMA-capable bus interface, the interface circuit having a multiplexer array for alternatively interconnecting the cache data memory to the DMA and non-DMA capable bus interfaces; and
a flash buffer memory disposed between the interface circuit and the non-DMA capable bus interface.

7. The adapter card of claim 6 wherein the cache data memory is an eight bit memory and the multiplexer array selects high and low bytes in sequence to provide sixteen bit access to the cache data memory.

8. The adapter card of claim 6 wherein the on-card DMA-capable bus is an industry standard architecture (ISA) bus and the non-DMA-capable bus is a personal computer memory card international association (PCMCIA) bus.

9. The adapter card of claim 7 wherein the on-card DMA-capable bus is an industry standard architecture (ISA) bus and the non-DMA-capable bus is a personal computer memory card international association (PCMCIA) bus.

10. An interface circuit for providing virtual direct memory access (DMA) capability to an adapter card connected to a computer system bus without DMA support, the interface circuit comprising:

connections for a DMA-capable bus;
connections for a non-DMA-capable bus;
connections for a cache memory;
a multiplexer array disposed between the DMA and non-DMA capable bus connections and the cache memory connections, the multiplexer array for alternatively interconnecting a cache memory to a DMA and a non-DMA capable computer bus; and
logic for controlling a cache memory and the multiplexer array, the logic connected to the multiplexer array and the cache memory connections.

11. The interface circuit of claim 10 wherein the DMA-capable bus is an industry standard architecture (ISA) bus and the non-DMA-capable bus is a personal computer memory card international association (PCMCIA) bus.

12. The interface circuit of claim 10 further comprising a cache memory connected to the cache memory connections.

13. The interface circuit of claim 11 further comprising a cache memory connected to the cache memory connections.

14. A computer implemented method for providing virtual direct memory access (DMA) data transfers between an adapter card and a host computer system having a bus with no DMA capability, the method comprising the steps of:

opening a common memory window between host system memory and a data cache memory on the adapter card;
requesting that data be moved between the host system memory and adapter card processing circuitry;
determining that data is to be moved from the adapter card processing circuitry to host system memory;
transferring a DMA packet to the data cache memory from the adapter card processing circuitry;
notifying the host computer system that the DMA packet has been transferred; and
transferring the DMA packet from the data cache memory to the host system memory.

15. A computer implemented method for providing virtual direct memory access (DMA) data transfers between a host computer system having a bus with no DMA capability and an adapter card, the method comprising the steps of:

opening a common memory window between host system memory and a data cache memory on the adapter card;
requesting that data be moved between the host system memory and adapter card processing circuitry;
determining that data is to be moved from host system memory to the adapter card processing circuitry;
transferring a DMA packet from host system memory to the data cache memory on the adapter card; and
loading the DMA packet into the adapter card processing circuitry.

16. A computer program product comprising:

a computer usable medium having a computer readable program embodied therein for causing virtual direct memory access (DMA) transfers on an adapter card attached to a computer bus without DMA support, the computer readable program in said computer program product further comprising:

computer readable program code for causing a computer to effect the opening of a common memory window between host system memory and a data cache memory on the adapter card;

computer readable program code for causing a computer to effect the requesting that data be moved between the host system memory and adapter card processing circuitry;

computer readable program code for causing a computer to effect the determining of a direction of data movement;

computer readable program code for causing a computer to effect the transferring of a DMA packet between the data cache memory and the adapter card processing circuitry;

computer readable program code for causing a computer to notify a host computer system that data is to be moved; and computer readable program code for causing a computer to effect the transferring of a DMA packet between the data cache memory and the host system memory.

* * * * *